United States Patent
Sato et al.

(10) Patent No.: US 8,136,406 B2
(45) Date of Patent: Mar. 20, 2012

(54) PRESSURE TRANSDUCER WITH PIEZOELECTRIC CRYSTAL FOR HARSH ENVIRONMENT USE

(75) Inventors: Shigeru Sato, Inagi (JP); Juei Igarashi, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 281 days.

(21) Appl. No.: 12/414,677

(22) Filed: Mar. 31, 2009

(65) Prior Publication Data

US 2010/0242615 A1  Sep. 30, 2010

(51) Int. Cl.
*G01L 11/00*  (2006.01)
(52) U.S. Cl. .................. 73/702; 73/715; 73/721
(58) Field of Classification Search .......... None
See application file for complete search history.

(56) References Cited

U.S. PATENT DOCUMENTS

| | | | |
|---|---|---|---|
| 3,617,780 A | 11/1971 | Benjaminson et al. | |
| 4,350,961 A * | 9/1982 | Toyokuni ................. 331/158 | |
| 4,419,600 A | 12/1983 | Sinha | |
| 4,547,691 A | 10/1985 | Valdois et al. | |
| 5,209,125 A * | 5/1993 | Kalinoski et al. ......... 73/861.24 | |
| 5,394,345 A | 2/1995 | Berard et al. | |
| 5,578,759 A | 11/1996 | Clayton | |
| 5,804,457 A * | 9/1998 | Benz et al. ................ 438/52 |
| 6,111,340 A | 8/2000 | Sinha et al. | |
| 7,098,574 B2 * | 8/2006 | Iwata ............................ 310/320 |
| 7,152,482 B2 * | 12/2006 | Ueno et al. ................ 73/723 |
| 7,235,913 B2 * | 6/2007 | Iwata ............................ 310/320 |
| 7,334,483 B2 | 2/2008 | Sato | |
| 7,646,138 B2 * | 1/2010 | Williams ................... 310/333 |
| 7,658,111 B2 * | 2/2010 | Zhang ............................ 73/723 |
| 2009/0009036 A1 | 1/2009 | Matsumoto et al. | |

FOREIGN PATENT DOCUMENTS

JP  05172679 A  *  7/1993

OTHER PUBLICATIONS

R.C. Turner, et al. "Materials for high temperature acoustic and vibration sensor: a review", Applied Acoustics, vol. 41, No. 4, 1994, pp. 299-324.
J. Sauerwald, et al., "Micromachined piezoelastic structures for high-temperature sensors," Journal of Electroceramics, vol. 22, No. 1, Feb. 2009, pp. 180-184.

* cited by examiner

*Primary Examiner* — Lisa Caputo
*Assistant Examiner* — Jermaine Jenkins
(74) *Attorney, Agent, or Firm* — Jianguang Du; Jody DeStefanis; Jeff Griffin

(57) ABSTRACT

A pressure transducer comprising a housing and a piezoelectric resonator in the housing, wherein the resonator is made of a piezoelectric crystal having Curie temperature greater than 1000° C. or having no Curie temperature up to its melting point greater than 1000° C., and the piezoelectric crystal has a piezoelectric constant more than two times greater than that of quartz.

13 Claims, 8 Drawing Sheets

PRESSURE TRANSDUCER WITH PIEZOELECTRIC CRYSTAL FOR HARSH ENVIRONMENT USE

FIELD OF THE INVENTION

The present invention relates generally to pressure transducers. More specifically, some aspects disclosed herein are directed to piezoelectric pressure sensors that are suitable for applications relating to oilfield wells or in pipelines.

BACKGROUND OF THE INVENTION

Piezoelectric pressure transducers have a crystal resonator located inside a housing with electrodes. Environmental pressure and temperature are transmitted to the resonator, via the housing, and changes in the resonator are sensed and used to interpret the pressure and/or temperature. U.S. Pat. No. 3,617,780 discloses one example of pressure transducer having a quartz crystal resonator with single-mode oscillation. The quartz resonator is affected by both temperature and pressure such that some devices may not be suitable for use in environments where both temperature and pressure vary. U.S. Pat. Nos. 4,419,600, 4,547,691 and 5,394,345 disclose examples of pressure transducers having a quartz dual mode resonator. In the dual-mode resonator, B-mode vibration is primarily only responsive to temperature whereas C-mode vibration is responsive to both temperature and pressure. Thus, by noting the change in frequency in both modes, temperature and pressure can be measured simultaneously.

Many advances in the science of quartz pressure/temperature transducers have been made in connection with oil field applications. Transient or dynamic pressure measurements are routinely employed in the estimation of formation permeability, reservoir pressure, formation continuity, and reservoir boundaries. The pressures encountered during such the estimation can be greater than 20,000 psi. While making measurements, the transducers can be subjected to temperatures of approximately 175° C. or more over. In addition, a subterranean tool with a pressure transducer is connected to equipment on the ground surface via a telecommunication cable and operated under the ground in relatively long operation time. In such oil field applications, there is a need for improved pressure transducers that are capable of measuring pressure more stably and accurately in high temperature and pressure environment with low power consumption.

As will become apparent from the following description and discussion, the present invention provides an improved pressure transducer capable of operating stably and accurately in high temperature and pressure environment with low power consumption.

BRIEF SUMMARY OF THE INVENTION

In one aspect of the present invention, a pressure transducer comprises a housing and a piezoelectric resonator in the housing. The resonator is made of a piezoelectric crystal having Curie temperature greater than 1000° C. or having no Curie temperature up to its melting point greater than 1000° C. The piezoelectric crystal has a piezoelectric constant more than two times greater than that of quartz. In some aspects disclosed herein, the piezoelectric crystal may be $LiNbO_3$ crystal. In yet other aspects, the piezoelectric crystal may be langasite-type crystal. The langasite-type crystal may be $La_3Ga_5SiO_{14}$, $La_3Ta_{0.5}Ga_{5.5}O_{14}$ or $La_3Ga_{5.5}Nb_{0.5}O_{14}$ crystal.

In aspects herein, the resonator may be configured or designed for vibrating in dual modes of fast and slow thickness-shear vibrations.

In aspects disclosed herein, the transducer housing may comprise a cylindrical body section and at least one end cap at one end of the body section. The resonator may be formed with an internal element extending in a plane parallel to the longitudinal direction of the body section and the internal element may be connected to the internal surface of the body section. In aspects herein, the at least one end cap may be a pair of end caps at opposite ends of the body section.

In aspects herein, the transducer housing may be axisymmetric and the resonator may be located in a radial plane within the housing. The resonator may comprise a peripheral portion sandwiched between end caps of the housing.

In aspects disclosed herein, the transducer housing may be axisymmetric and may comprise cylindrical body section and at least one end cap at one end of the body section. The resonator may be formed with a discoid element connected to the internal surface of the body section with the resonator having a generally H-shape in cross section. The at least one end cap may be a pair of end caps at opposite ends of the body section.

In aspects herein, the resonator may a plano-convex resonator. In other aspects, the resonator may be a bi-convex resonator. In yet other aspects, the resonator may have different radii of curvature along two orthogonal axes thereof.

The disclosure herein provides a tool for pressure measurement comprising a pressure transducer and at least one oscillator circuit coupled to the pressure transducer. The pressure transducer comprises a housing and a piezoelectric resonator in the housing wherein the resonator is made of a piezoelectric crystal having Curie temperature greater than 1000° C. and a piezoelectric constant more than two times greater than that of quartz. In some aspects herein, the tool may comprise a temperature sensor disposed on or near an outer surface of the pressure transducer.

Additional advantages and novel features of the invention will be set forth in the description which follows or may be learned by those skilled in the art through reading the materials herein or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain principles of the present invention.

Figure 1:
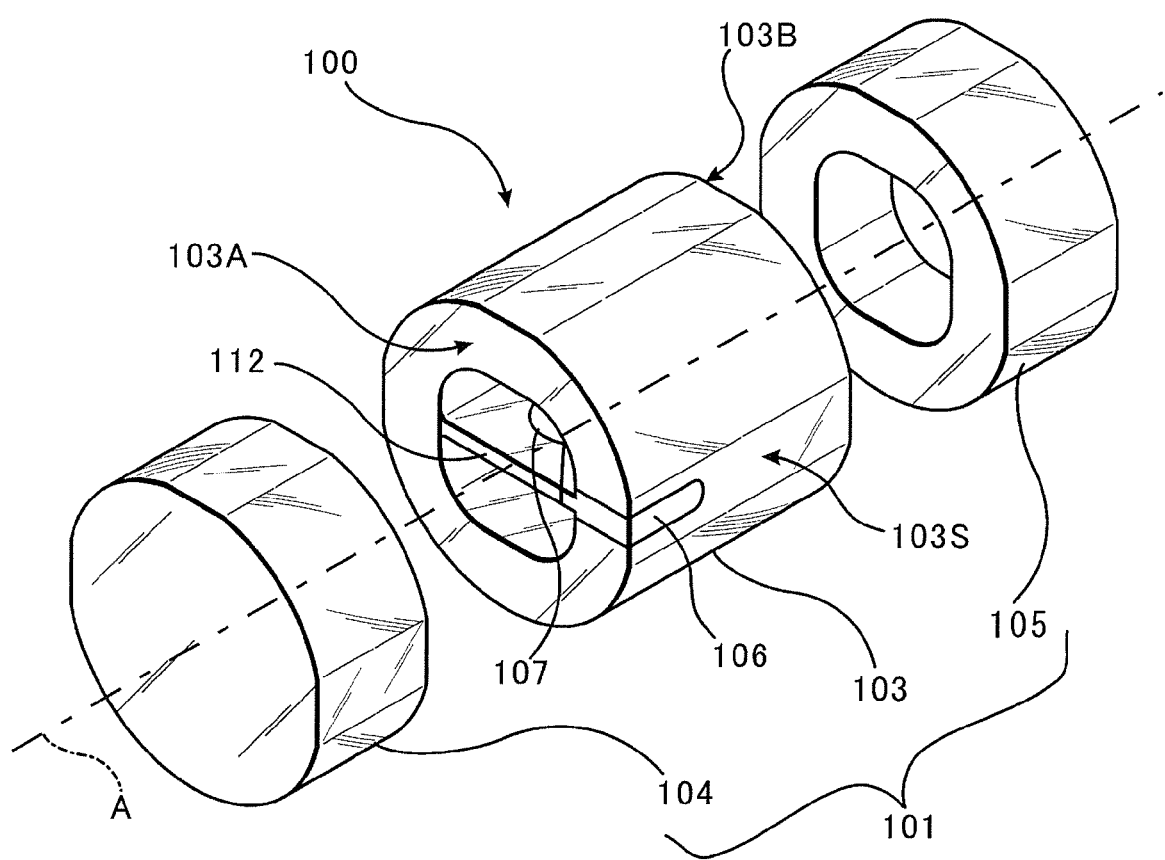
FIG. 1 is an exploded perspective view of one exemplary pressure transducer according to the disclosure herein.

Throughout the drawings, identical reference numbers indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Piezoelectric crystal material used for pressure transducers in embodiments herein has Curie temperature greater than 1000° C. or no Curie temperature up to its melting point greater than 1000° C. The piezoelectric crystal has a piezoelectric constant more than two times greater than that of quartz and an electromechanical coupling factor greater than that of quartz. One example of piezoelectric crystals having such physical characteristics is $LiNbO_3$ (Lithium Niobate) single crystal. Langasite-type single crystal such as $La_3Ga_5SiO_{14}$ (Langasite), $La_3Ta_{0.5}Ga_{5.5}O_{14}$ (Langatate) or $La_3Ga_{5.5}Nb_{0.5}O_{14}$ (Langanite) crystal may be used for the pressure transducers in embodiments herein. Table 1 shows some examples of piezoelectric crystals having such physical characteristics. In Table 1, typical values of Curie temperature, piezoelectric constants and electromechanical coupling factor of the piezoelectric crystals are listed together with those of quartz for comparison.

TABLE 1

| Name | Chemical Formula | Curie Temperature (° C.) | Piezoelectric Constant (C/N) | Electromechanical Coupling Factor $K_s^2$ (%) |
|---|---|---|---|---|
| Lithium Niobate | $LiNbO_3$ | 1200 | $d_{22} = 2.0 \times 10^{-11}$ $d_{33} = 1.9 \times 10^{-10}$ | 5.5 |
| Langasite | $La_3Ga_5SiO_{14}$ | — | $d_{11} = 6.3 \times 10^{-12}$ $d_{14} = 5.4 \times 10^{-12}$ | 0.28~0.46 |
| Quartz | $SiO_2$ | 550 | $d_{33} = 2 \times 10^{-12}$ | 0.1~0.2 |

Piezoelectric crystal for a resonator used in embodiments herein comprises single rotation cut piezoelectric crystal such as X cut crystal and Y cut crystal, and double rotation cut piezoelectric crystal which is doubly rotated with respect to angles of $\phi$(phi) and $\theta$(theta). The crystalline orientations of doubly-rotated resonators follow the Standard on Piezoelectric Crystals, 1949, published in the Proceedings of the Institute of Radio Engineers, New York, December 1949.

In general, there are three modes of acoustic waves propagating in a crystal solid. One is the fastest compressional wave and the others are the fast shear wave and the slow shear wave. When the three modes of acoustic waves propagate in a resonator such as a discoid crystal, a plurality of vibrations such as compressional vibrations, fast and slow thickness-shear vibrations are generated as standing waves in the resonator. In the embodiments herein, the resonator may be configured or designed for vibrating in dual modes of fast and slow thickness-shear vibrations at different frequencies by cutting the above-mentioned piezoelectric crystal such as $LiNbO_3$ (Lithium Niobate) single crystal and Langasite-type single crystal along a specific plane oriented at the angles of $\phi$(phi) and $\theta$(theta). Both modes of the fast and slow thickness-shear vibrations are generally more or less sensitive to stress and temperature but each has different sensitivities of stress and temperature from each other. The crystal orientation of the resonator may be selected so that one mode is more sensitive to stress and less sensitive to temperature than the other.

There are several advantages in using the piezoelectric crystals with higher Curie temperatures and electromechanical coupling factors. By using the piezoelectric crystal material with Curie temperature greater than 1000° C. or no Curie temperature up to its melting point greater than 1000° C., the pressure transducer with pressure and temperature ratings higher than a quartz pressure transducer can be designed. Furthermore, by using the piezoelectric crystal having a piezoelectric constant more than two times greater than that of quartz, at least one mode of thickness-shear vibrations or thickness-longitudinal vibrations can be activated more easily and power consumption of an oscillating circuit with the resonator can be reduced compared with a quartz resonator. Pressure sensors using a quartz resonator often suffers from twining at a combination condition of high temperature and high pressure even though the temperature is much below the Curie temperature and stop working properly. This is considered that quartz crystal reconstructs itself so as to keep a lower internal energy level. Pressure sensors made of higher Curie temperature crystals withstand higher pressure at the high temperature. The higher electromechanical coupling factor allows one to make resonators with a stable and low drift resonance frequency. Because of the higher electromechanical coupling factor than that of quartz, lower activating voltages can drive the resonator. The lower voltage may reduce the risk that electrode metal atoms diffuse into the crystal and induce a long-term frequency drift phenomena, which are known in the quartz resonator in high temperature environments.

Figure 2:
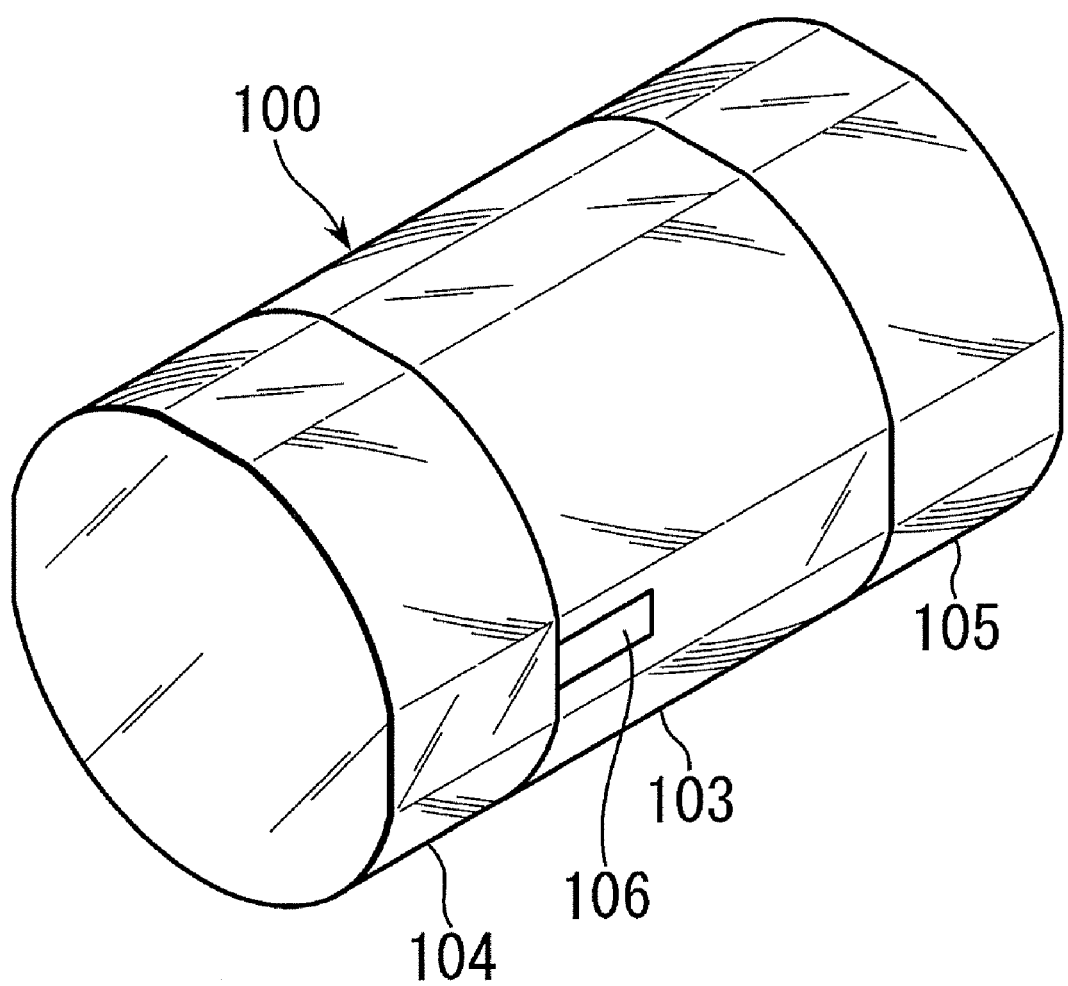
FIG. 2 is a perspective view of the pressure transducer after assembling.
Figure 3:
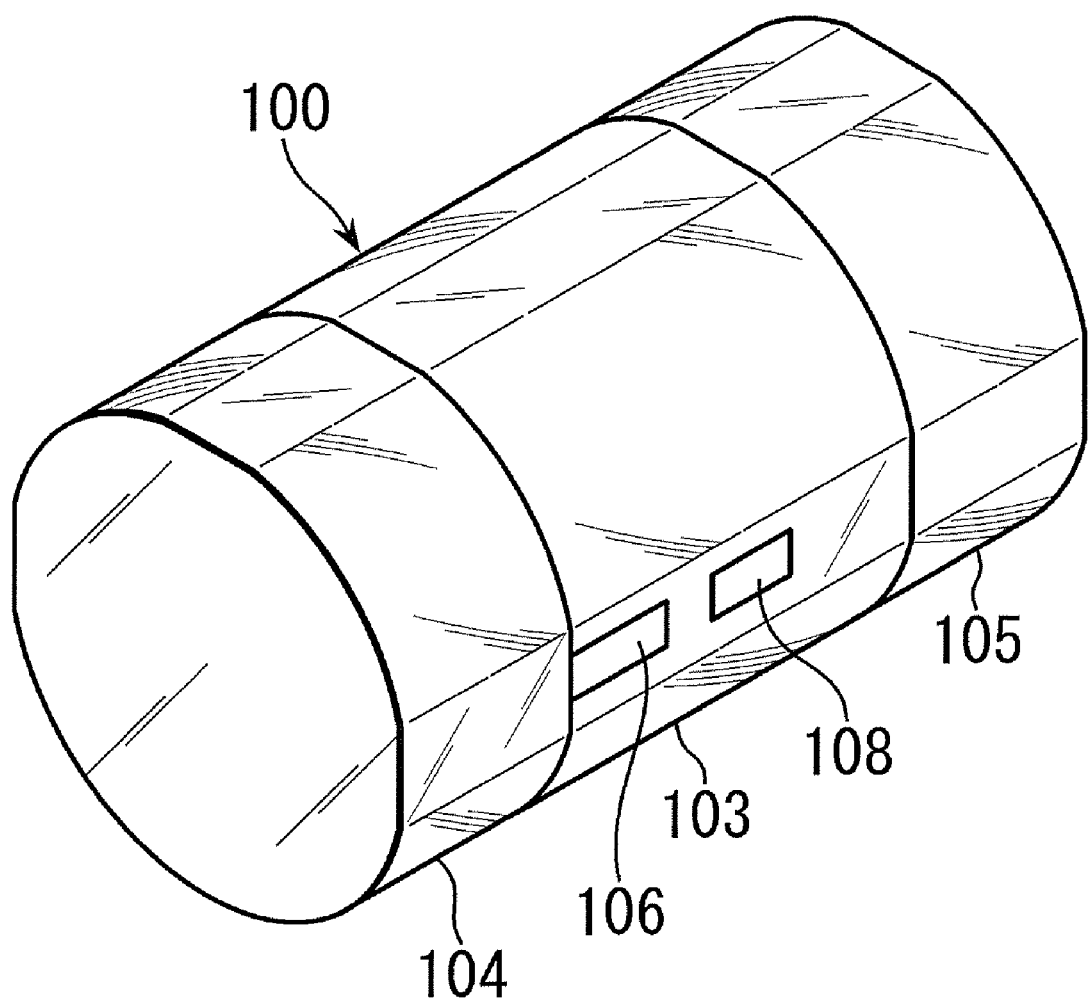
FIG. 3 is a perspective view of another exemplary pressure transducer according to the disclosure herein.

Referring now to FIG. 1, a pressure transducer 100 according to one embodiment of the present invention comprises a housing 101 and a piezoelectric resonator 112 in the housing 101. This design of pressure transducer 100 is suitable for use of the dual mode oscillation in the resonator 112. The housing 101 includes a cylindrical body section 103 and a pair of end caps 104 and 105 at opposite ends of the body section 103. The resonator 112 is formed with an internal element extending in a plane parallel to the longitudinal direction (axis A in FIG. 1) of the body section 103, the internal element being connected to the internal surface of the body section 103. The assembly of the body section 103 and the resonator 112 is of unit construction cut in the same crystal block of the aforementioned piezoelectric crystal such as $LiNbO_3$. This structure is designed so that the thickness shear vibration mode in the direction parallel to the cylinder body axis, which is less sensitive to stress, is free from stress propagation from the outer sensor body by disconnecting one pair of the resonator edge from the sensor body. A pair of output electrodes 106 extending from electrodes 107 on both surfaces of the resonator 112 are fabricated on opposite side faces 103S of the body section 103. In its assembled structure in FIG. 2, the transducer 100 has the end caps 104 and 105 which are applied on end faces 103A and 103B of the body section 103 and can be secured thereto by glass frit bonding, gluing, fusion bonding or metal-metal bonding for example. The end caps 104 and 105 may be made of the foregoing piezoelectric crystal and preferably cut from piezoelectric crystal blocks adjacent to the crystal block for the body section 103. A thermometer 108 may be attached, for example, on the outer side surface of the pressure transducer 100 as shown in FIG. 3. An RTD type temperature measurement device may be used as the thermometer 108. Other structures of pressure transducers described in U.S. Pat. No. 4,547,691 may be used instead of the structures in FIGS. 1, 2 and 3. The U.S. Pat. No. 4,547,691 is incorporated herein by reference in its entirety.

Figure 4A:
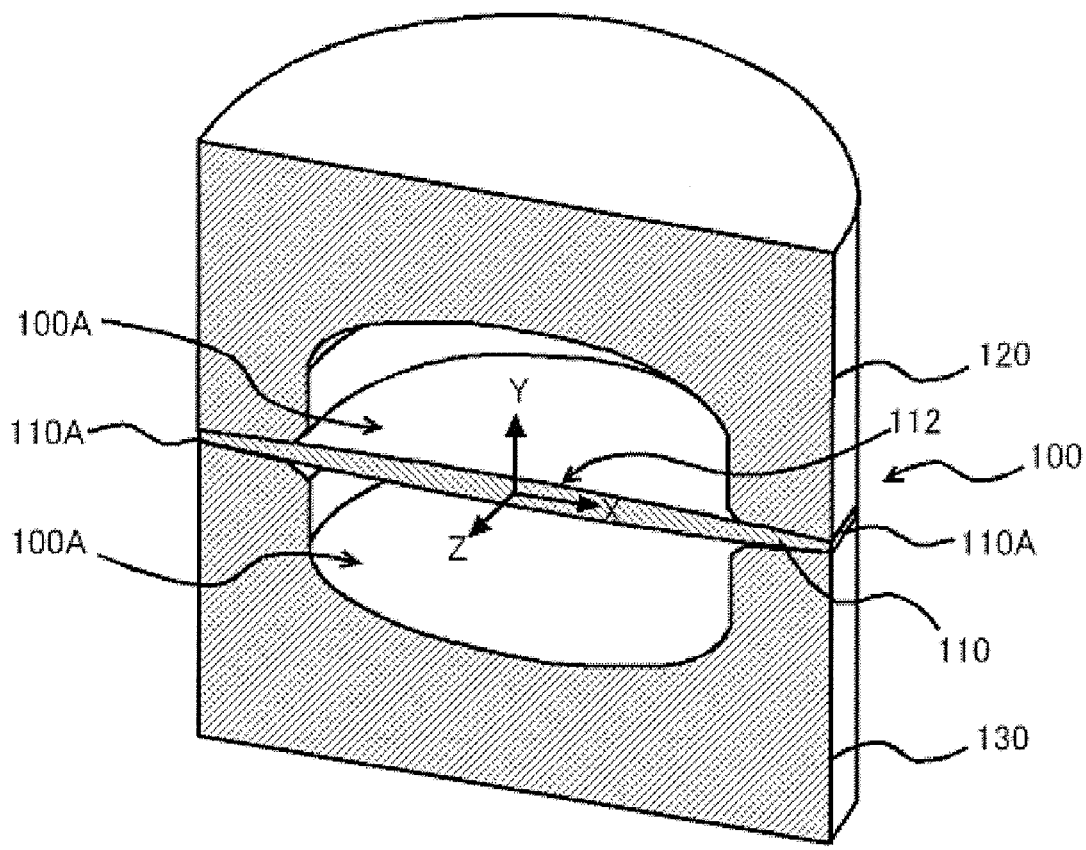
FIGS. 4A and 4B are cross sectional views of yet another exemplary pressure transducer according to the disclosure herein.
Figure 4B:
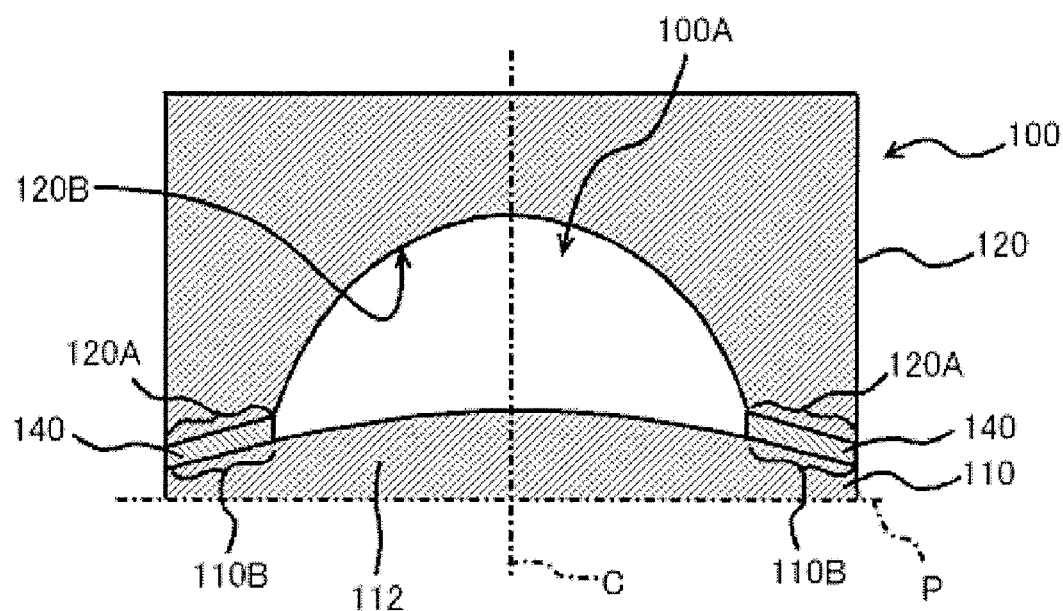

FIG. 4A depicts a pressure transducer of according to another embodiment of the present invention. This design can be used for both of single mode and dual mode vibrations oscillation in the resonator. The pressure transducer 100 comprises an axisymmetric housing 120, 130 that is hollow inside and a bi-convex resonator 112 located in a radial plane within the housing. The resonator 112 includes a plate portion 110 with a circumferential edge surface 110A. The end caps 120, 130 are at opposite sides of the plate 110. The end caps 120, 130 are attached to the plate 110 so as to define a cavity 100A within which the resonator 112 is located. The plate 110 of the resonator 112 and the end caps 120, 130 may be formed as unitary axisymmetric structures from a crystal block of the aforementioned piezoelectric crystal such as LiNbO$_3$. Thus, the plate 110 and end caps 120, 130 are plane-symmetric about a center plane P and axisymmetric about C axis as shown in FIG. 4B. The end caps 120, 130 are attached to the ends 110B of plate 110 via bonding interfaces 140. Each radius of curvature of bonded surfaces of end caps 120, 130 may be same as the radius of curvature of corresponding bonded surface of plate 110. For example, the radius of curvature of bonded surface 120A of end cap 120 may be same as the radius of curvature of bonded surface 110B of plate 110. The inner surface 120B of end cap 120 may be hemispherical or quasi-hemispherical in shape, as shown in FIG. 2B, with the same shape for end cap 130. In other embodiments, the inner surfaces of end caps 120, 130 may be elliptical in cross-sectional shape, that is, quadratic surface.

Figure 5:
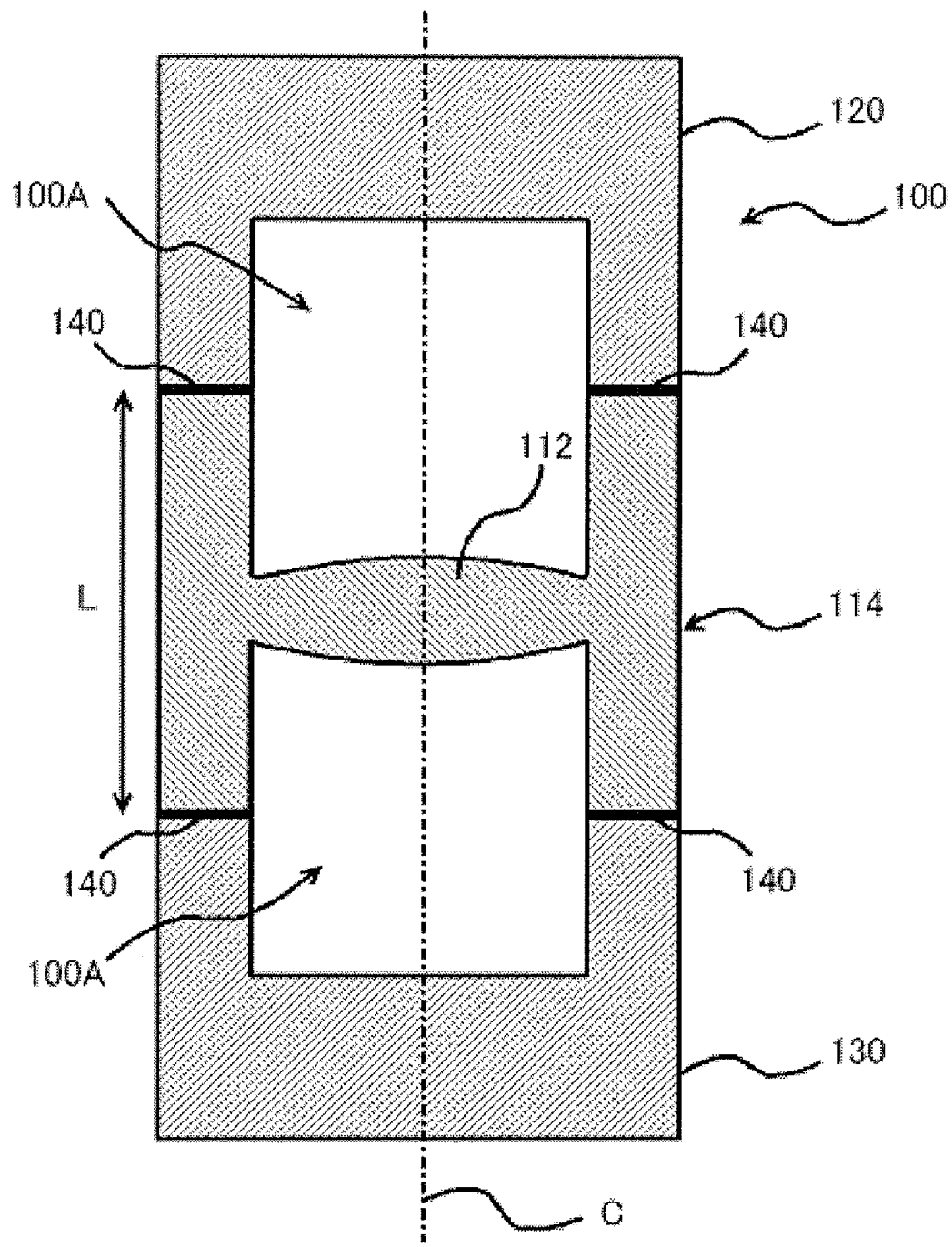
FIG. 5 shows yet another exemplary pressure transducer according to the disclosure herein.
Figure 6A:
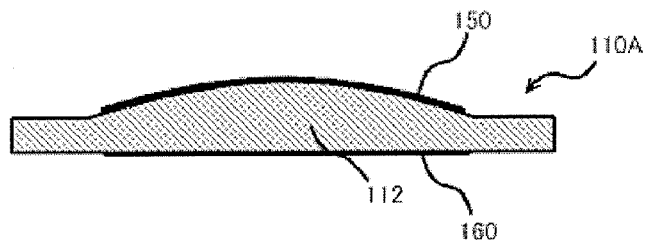
FIGS. 6A-6E show examples of cross sectional shapes of exemplary resonator according to the disclosure herein.
Figure 6B:
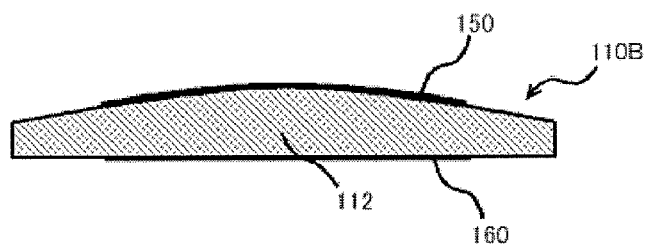
Figure 6C:
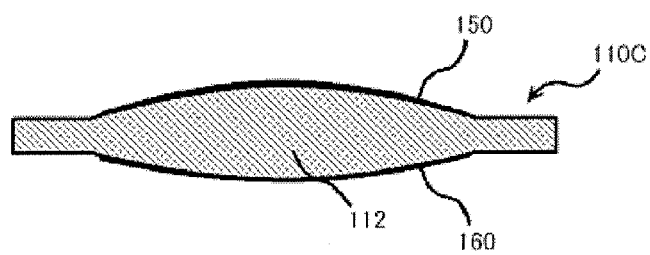
Figure 6D:
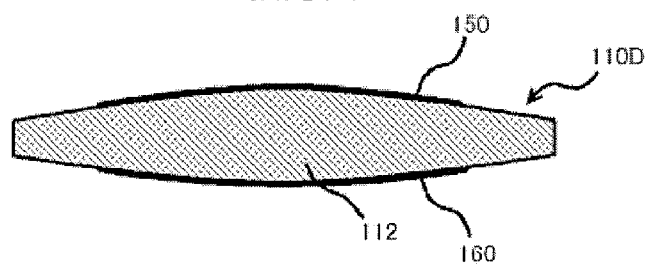
Figure 6E:
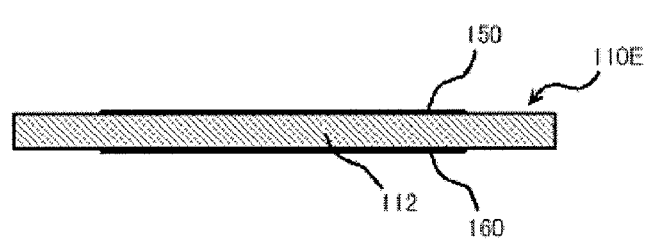

FIG. 5 shows yet another embodiment of a pressure transducer 100 comprising a resonator 112 having a body section 114 instead of the plate-like structure 110 described above. This design can be used for both of single mode and dual mode vibrations in the resonator. The body section 114 may have a cylindrical outer shape and be generally H-shaped in cross section. End caps 120, 130 are provided at ends of the body section 114, attached via bonding interfaces 140, and resonator 112 may have a bi-convex shaped resonating element located in a radial plane within the transducer 100. By adjusting length L of the extended portions of the body section 114, shear stress at the bonding interface 140 may be reduced so that more stable pressure measurements can be performed. It has been found that the substantially symmetrical structure of the bi-convex resonator makes that the transducer stronger than an asymmetrical structure so that pressure measurements in higher pressure ranges are possible.

In the above described embodiments in FIGS. 4A, 4B and 5, a thermometer may be attached, for example, on the outer surface of the pressure transducer 100. Other structures of pressure transducers described in U.S. Patent Application Publication No. 20090009036 and U.S. Pat. No. 6,111,340 may be used instead of the structures in FIGS. 4A, 4B and 5. The U.S. Patent Application Publication No. 20090009036 and the U.S. Pat. No. 6,111,340 are incorporated herein by reference in their entirety.

FIGS. 6A-6E show some examples of cross sectional shapes for resonators. Electrodes 150, 160 are provided on opposite surfaces in central portions of the plate 110 by conventional methods, such as vacuum evaporation deposition and sputtering. The electrode material is typically gold where an intermediate layer of chromium may be used to inhibit migration of gold into the piezoelectric crystal material. Thickness of the electrodes 150, 160 may be in the order of a few 100 Angstrom. The resonator 112 is formed in the portion between the electrodes 150, 160. One shape of the resonator 112 is plano-convex as shown in FIGS. 5A and 5B. By using the plano-convex resonator, the energy of thickness vibrations can be trapped in the resonator 112 so as to reduce mounting losses and possible reflections of anharmonic overtones from the electrode and plate boundaries. In other words, the plano-convex resonator reduces undesired modes of vibration and confines resonant vibration energy as much as possible for a high Q-value. Other shapes of the resonator may also be adopted, such as a bi-convex resonator, as shown in FIGS. 5C and 5D, or flat resonator, as shown in FIG. 5E. In plano-convex and bi-convex resonators, the circumferential end portion surrounding the resonating element 112 of the plate 110 may be flat, as shown in FIGS. 5A and 5C, so that good sealing may be obtained between the plate 110 and end caps 120, 130 without having to shape the end surfaces of the end caps 120, 130.

Figure 7:
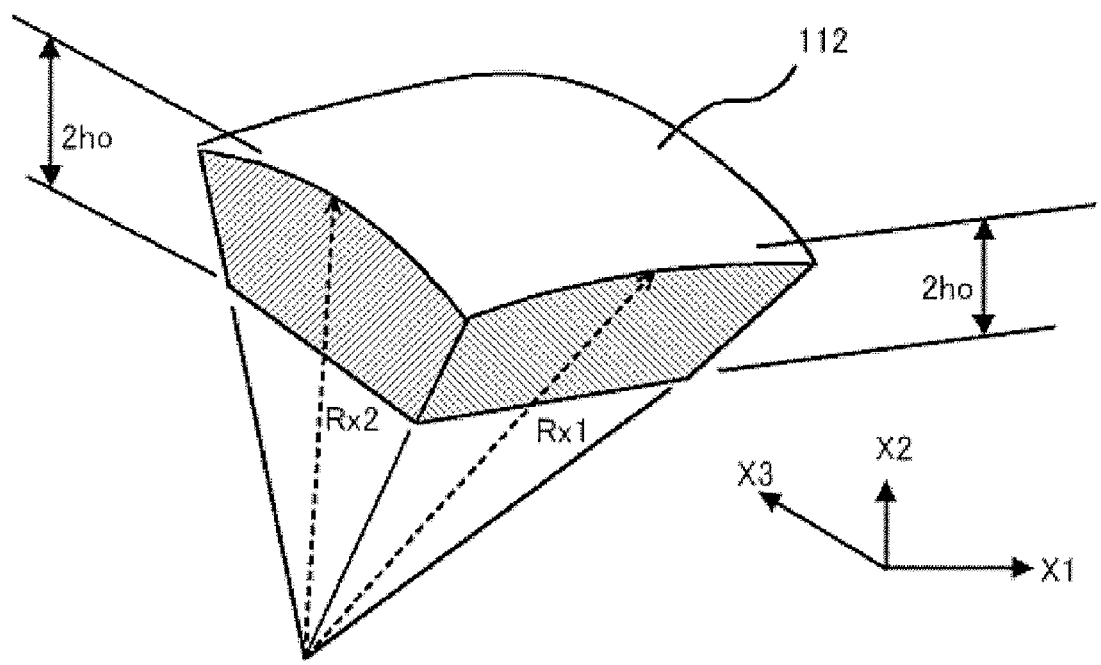
FIG. 7 is a schematic diagram of one non-spherically contoured plano-convex resonator.

By adjusting curvature of the convex surface, it is possible to reduce reflections of anharmonic overtones from the electrode edges and increase the frequency separation between the mode of interest and unwanted mode. The convex surface of the resonator 112 may have different radii of curvature along mutually crossing directions that are designed as X and Z directions in FIG. 4A. Referring to FIG. 7, for example, the radii of curvature $R_{X1}$, $R_{X3}$ along the X1 and X3 directions on the resonator surface 112 may be adjusted. By using the non-spherically contoured plano-convex resonator, having different radii of curvature along mutually crossing directions, the excitation of certain anharmonic overtones can be suppressed.

Figure 8:
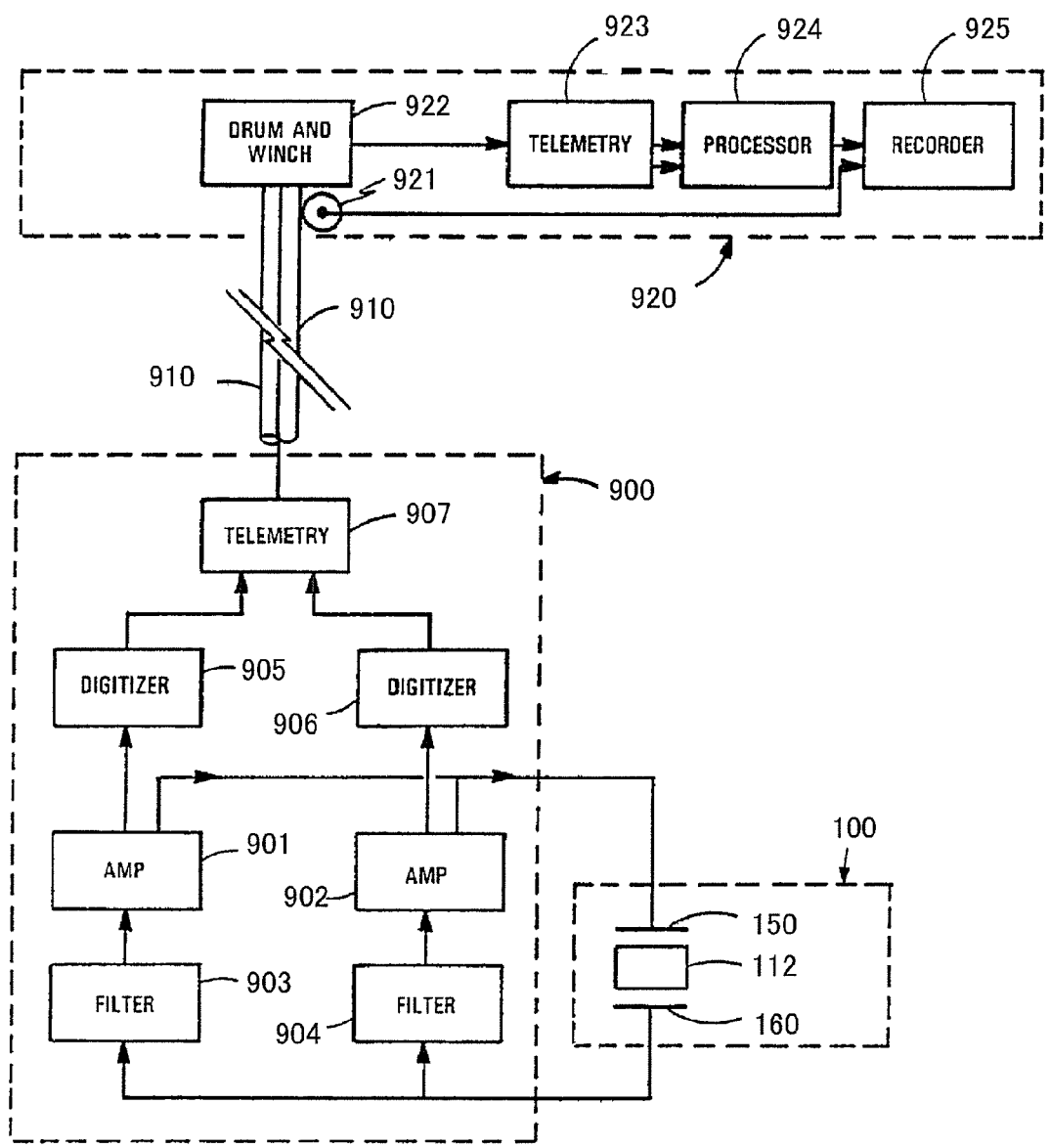
FIG. 8 is a schematic diagram of one exemplary apparatus for measuring pressures in a well passing through earth formations in accordance with the present disclosure.

FIG. 8 is a schematic representation of one precision pressure measurement system for use in the exploration and production of hydrocarbons. A pressure transducer 100 comprises a piezoelectric resonator 112 disposed between electrodes 150, 160. The pressure transducer 100 and associated downhole electronics 900 may be associated with, for example, a downhole tool to take formation fluid pressures. The resonator 112 may be configured to operate in dual modes of vibration by application of an AC signal to electrodes 150, 160 by amplifiers 901 and 902. In the dual modes, one resonance frequency of output signal from amplifier 901 is attributed to the slow thickness-shear vibration in the crystal and the other resonance frequency of output signal from amplifier 902 is attributed to the fast thickness-shear vibration. In general, the resonance frequency of each mode has different stress sensitivity and temperature sensitivity from each other. It is possible to choose a specific crystal orientation of the resonator 112 so that one mode is more stress sensitive and less temperature sensitive than the other. Utilizing those characteristics, it is possible to compensate temperature effect in pressure readings in one resonator. Filters 903 and 904, having appropriate filter constants, such as poles and/or zeros relative to the frequencies modes, are provided to separate the energy from the variation in the two modes of the single pair of electrodes 150, 160. Amplifier 901 and filter 903 are configured to form one oscillator for oscillating at the resonance frequency corresponding to slow thickness-shear vibration of the resonator 112. Amplifier 902 and filter 904 are configured to form another oscillator for oscillating at the resonance frequency corresponding to the fast thickness-shear vibration.

The dual mode signals from amplifiers 901 and 902 are applied to respective digitizers 905 and 906. The digitized signals are applied to telemetry system 907 where they are multiplexed and transmitted to surface equipment 920, for example, via an armored cable 910.

For example, a logging device may be suspended in the borehole on the armored cable 910, the length of which substantially determines the relative depth of the logging device. The length of armored cable 910 is controlled by suitable means at the surface, such as a drum and winch mechanism 922. The armored cable 910 is rewound on the drum to raise the logging device toward the surface as measurements are taken. Depth measurements are provided by a measure wheel 921, or another suitable means for the depth measurements. Telemetry signals transmitted over armored cable 910 are supplied to telemetry system 923. The signals are demultiplexed and digital frequency information for the two modes is supplied to processor 924. Processor 924 determines the temperature compensated pressure in accordance with the known methods, such as a curve fitting routine, or any other suitable method, and supplies this information to recorder 925 which, receiving depth information from measure wheel 921, records pressure as a function of depth.

In the aspects, surface temperature on the pressure transducer 100 may be measured for accurate thermal compensation of pressure values obtained by a pressure transducer, as described in U.S. Pat. No. 7,334,483, which is incorporated herein by reference in its entirety.

The surface temperature of a pressure gauge may be obtained with a thermometer. For example, a RTD type temperature measurement device may be used as the thermometer and may be attached to the peripheral surface of the resonator, as shown in FIG. 3. In this, a thin film Pt resistor may be deposited directly on the outer surface of the body section. The Pt resistor is also sensitive to pressure, but its pressure dependency is repeatable. Both pressure transducer and thermometer may be calibrated simultaneously to temperature and pressure measurements.

The preceding description has been presented only to illustrate and describe certain embodiments. It is not intended to be exhaustive or to limit the invention to any precise form disclosed. Many modifications and variations are possible in light of the above teaching.

The embodiments and aspects were chosen and described in order to best explain principles of the invention and its practical applications. The preceding description is intended to enable others skilled in the art to best utilize the principles in various embodiments and aspects and with various modifications as are suited to the particular use contemplated. It is intended that the scope of the invention be defined by the following claims.

What is claimed is:

1. A pressure transducer comprising:
a housing and a piezoelectric resonator in the housing, wherein
the resonator is made of a piezoelectric crystal having Curie temperature greater than 1000° C. or having no Curie temperature up to its melting point greater than 1000° C., and
the piezoelectric crystal has a piezoelectric constant more than two times greater than that of quartz,
wherein:
the housing comprises a cylindrical body section and at least one end cap at one end of the body section; and
the resonator is formed with an internal element extending in a plane parallel to the longitudinal direction of the body section, the internal element being connected to the internal surface of the body section.

2. The pressure transducer according to claim 1, wherein the piezoelectric crystal is $LiNbO_3$ crystal.

3. The pressure transducer according to claim 1, wherein the piezoelectric crystal is langasite crystal.

4. The pressure transducer according to claim 1, wherein the resonator is configured or designed for vibrating in dual modes of fast and slow thickness-shear vibrations.

5. The pressure transducer according to claim 1, wherein the at least one end cap is a pair of end caps at opposite ends of the body section.

6. The pressure transducer according to claim 1, wherein:
the housing is axisymmetric; and
the resonator is located in a radial plane within the housing, the resonator comprising a peripheral portion sandwiched between end caps of the housing.

7. The pressure transducer according to claim 1, wherein the resonator is a plano-convex resonator.

8. The pressure transducer according to claim 1, wherein the resonator is a bi-convex resonator.

9. The pressure transducer according to claim 1, wherein the resonator has different radii of curvature along two orthogonal axes thereof.

10. A pressure transducer comprising:
a housing and a piezoelectric resonator in the housing, wherein
the resonator is made of a piezoelectric crystal having Curie temperature greater than 1000° C. or having no Curie temperature up to its melting point greater than 1000° C., and
the piezoelectric crystal has a piezoelectric constant more than two times greater than that of quartz,
wherein:
the housing is axisymmetric, the housing comprising a cylindrical body section and at least one end cap at one end of the body section; and
the resonator is formed with a discoid element connected to the internal surface of the body section, the resonator having a generally H-shape in cross section.

11. The pressure transducer according to claim 10, wherein the at least one end cap is a pair of end caps at opposite ends of the body section.

12. A tool for pressure measurement comprising:
a pressure transducer and at least one oscillator circuit coupled to the pressure transducer, wherein
the pressure transducer comprising:
a housing comprising a cylindrical body section and at least one end cap at one end of the body section;
a piezoelectric resonator in the housing, wherein
the resonator is made of a piezoelectric crystal having Curie temperature greater than 1000° C. and a piezoelectric constant more than two times greater than that of quartz, and
the resonator is formed with an internal element extending in a plane parallel to the longitudinal direction of the body section, the internal element being connected to the internal surface of the body section.

13. The tool according to claim 12, further comprising a temperature sensor disposed on or near an outer surface of the pressure transducer.

* * * * *